United States Patent [19]

Kobayashi

[11] Patent Number: 5,757,277
[45] Date of Patent: May 26, 1998

[54] WIRELESS SELECTIVE CALL RECEIVER AND METHOD AND SYSTEM FOR WRITING DESIRED DATA IN THE SAME

[75] Inventor: Yasuhiro Kobayashi, Tokyo, Japan

[73] Assignee: NEC Corporation, Tokyo, Japan

[21] Appl. No.: 576,304

[22] Filed: Dec. 21, 1995

[30] Foreign Application Priority Data

Dec. 28, 1994 [JP] Japan .................. 6-337474

[51] Int. Cl.$^6$ .............. H04Q 7/22; H04Q 1/00; H04M 11/00
[52] U.S. Cl. .............. 340/825.22; 340/825.44; 340/825.25; 340/825.72; 379/56.1; 359/152; 359/154; 359/163; 359/189
[58] Field of Search .............. 340/825.22, 825.25, 340/825.44, 825.69, 825.72; 379/56, 57, 58, 56.1; 359/152, 154, 163, 189, 195; 371/5.5, 5.1; 395/200.13, 878, 880

[56] References Cited

U.S. PATENT DOCUMENTS

| | | | |
|---|---|---|---|
| 4,957,348 | 9/1990 | May | 350/321 |
| 5,043,721 | 8/1991 | May | 340/825.44 |
| 5,446,783 | 8/1995 | May | 379/59 |
| 5,455,570 | 10/1995 | Cook et al. | 340/825.22 |
| 5,537,410 | 7/1996 | Li | 370/84 |

FOREIGN PATENT DOCUMENTS 63-153489  6/1988  Japan.

*Primary Examiner*—Michael Horabik
*Assistant Examiner*—Yonel Beaulieu
*Attorney, Agent, or Firm*—Sughrue, Mion, Zinn, Macpeak & Seas, PLLC

[57] ABSTRACT

In writing of a communication data from a data transfer apparatus into a wireless selective call receiver, an appropriate transmission rate is first determined through communicating between a wireless selective call receiver and a data transfer apparatus via an optical transmission path while changing a transmission rate. When the appropriate transmission rate is determined, a communication data is automatically transmitted with the determined appropriate transmission rate from the data transfer apparatus to the selective call receiver via the optical transmission path such that the communication data is written in the receiver. When the write operation of the communication data is completed, the verifying operation is automatically performed to determine whether the communication data is accurately written in the receiver.

16 Claims, 4 Drawing Sheets

WIRELESS SELECTIVE CALL RECEIVER AND METHOD AND SYSTEM FOR WRITING DESIRED DATA IN THE SAME

BACKGROUND OF THE INVENTION

1. Field of the Invention

The present invention relates to a wireless selective call receiver, and more particularly to data writing in a wireless selective call receiver.

2. Description of Related Art

Conventionally, a wireless selective call receiver (to be simply referred to as "receiver" hereinafter) or a pager has a connector via which the receiver is connected to an external apparatus. Data such as an ID number assigned to the receiver and data necessary for performing various functions of the receiver are transmitted from the external apparatus to the receiver via the connector and stored in the receiver. However, in a case where the connector is provided in the receiver, since the connector is exposed from the receiver case, there is a problem in water-proof property and dust-proof property of the receiver.

For this reason, it has been tried to transmit or write data in an apparatus by use of light. The technique for transmitting data between apparatuses by use of the infrared light is disclosed in, for example, Japanese Laid Open Patent Disclosure (JP-A-Showa 63-153489) in which an apparatus for detecting data from a mobile vehicle by use of the infrared light is described. However, in the data transmission and reception using the infrared light, there is a problem in that an error rate in data transmission is high, compared to that in the electric data transmission by use of a connector. Specifically, in the technique described in the above reference, since a data transmission rate is fixedly set, if data is transmitted at high speed, the error rate is extremely high. For this reason, in the data transmission using the infrared light, the data transmission rate or baud rate conventionally needs to be set to be low to suppress the error rate. As a result, there is a problem in that a long data transmission time is required.

Recently, receivers or pagers are used between many persons. In order to make the receiver available after it is manufactured, data such as an ID data assigned to the receiver and data necessary for performing various functions of the receiver need to be written in the receiver. However, as described above, since the transmission rate is low in the data transmission using infrared light, there is a problem in that the work efficiency is low.

SUMMARY OF THE INVENTION

An object of the present invention is to provide a wireless selective call receiver in which data can be transmitted and written at a transmission rate as high as possible while suppressing any data error.

Another object of the present invention is to provide a method and system for automatically transmitting and writing data in a wireless selective call receiver with a high transmission rate without wasting the data transmission time.

In order to achieve an aspect of the present invention, a wireless selective call receiver includes an optical transmitting section for optically transmitting data with a transmission rate, an optical receiving section for optically receiving data with the transmission rate, a storage section for storing a receiver information, a program storage section for storing a program composed of an initial program, a data write program and a use program, and a control section for executing the initial program to control the transmitting section to optically transmit predetermined data when the receiver is turned on, and to automatically initiate, when a response is received by the receiving section within a predetermined time period after the transmission of the predetermined data, the data write program:

to determine transmission rate through communication with an external apparatus using the transmitting and receiving sections while changing a transmission rate;

in response to an inputted transmission read signal, to receive, by the receiving section, data transmitted from the external apparatus with the determined appropriate transmission rate and to store the received data in the storage section; and when the write operation is completed, to read the stored data from the storage section to transmit to the external apparatus by the transmitting section.

In order to determine the appropriate transmission rate so that the data can be written with the determined appropriate transmission rate, the control section may execute the data write program: (a) to set a predetermined transmission rate as a current transmission rate to the transmitting and receiving sections; (b) to control the transmitting section to transmit test data having a predetermined bit pattern to the external apparatus with the current transmission rate; (c) to control the receiving section to receive a transmission ready signal from the external apparatus and then to receive the data, and to write the received data into the storage section; and (d) to control the receiving section to receive a transmission failure signal from the external apparatus and then to set a transmission rate lower than the current transmission rate as a new current transmission rate in the transmitting and receiving sections, and further to repeat the step (b) until the appropriate transmission rate is determined. In this case, the transmission rates are predetermined in a higher order and held in the receiver and the external apparatus.

Alternatively, prior to the transmission of the test data, data indicative of the transmission rate may be transmitted. In this case, the data indicative of the transmission rate is transmitted with a predetermined transmission rate and the test data is transmitted with the transmission rate indicated by the data.

In a case that it is determined, based on the data read out from the storage section, that the data is not accurately written, the operation of determining an appropriate transmission rate is executed again.

In another aspect of the present invention, in order to write data from a data transfer apparatus into a wireless selective call receiver, the transmission rate is first determined through communicating between a wireless selective call receiver and a data transfer apparatus via an optical transmission path while changing a transmission rate. Then, the desired data is transmitted with the determined transmission rate from the data transmission apparatus to the selective call receiver via the optical transmission path such that the data is written in the receiver. After the write operation, it is verified that the data is accurately written in the receiver.

DESCRIPTION OF THE PREFERRED EMBODIMENT

Figure 1:
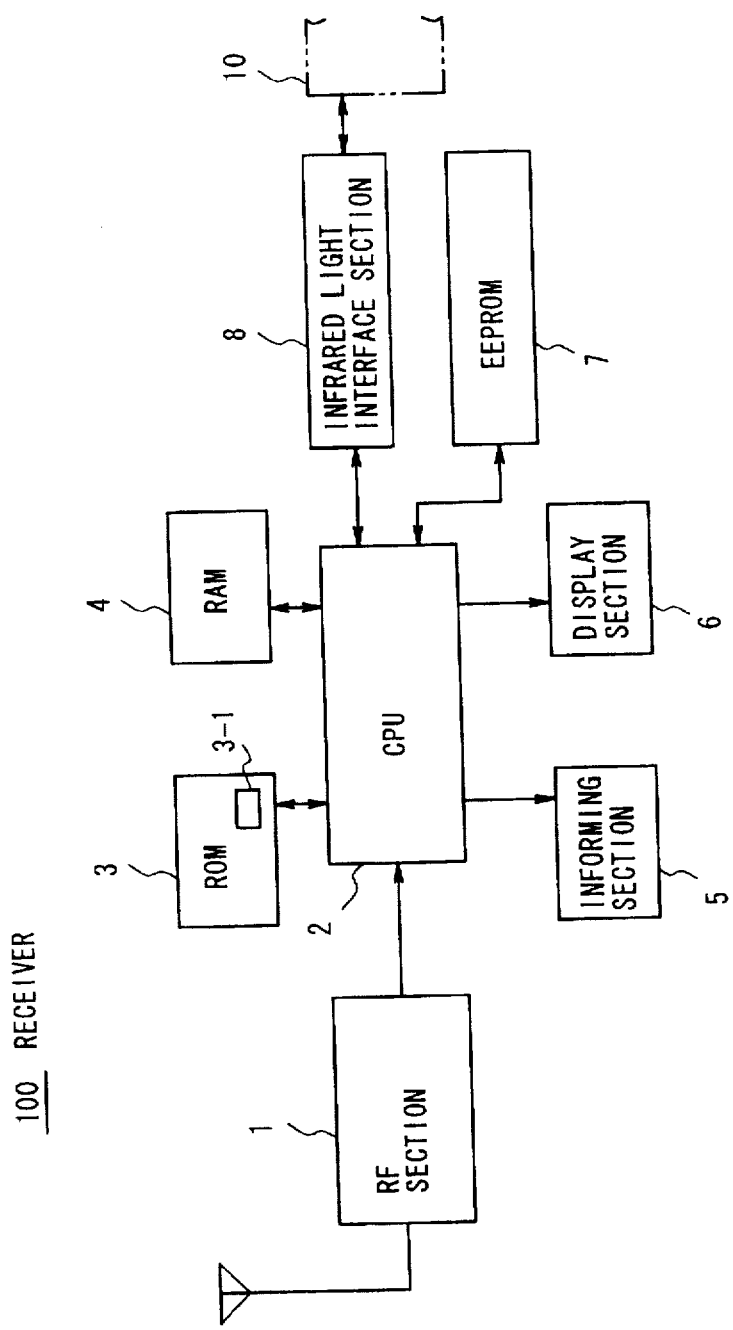
FIG. 1 is a block diagram of the structure of a data writing system including a wireless selective call receiver according to an embodiment of the present invention.

Next, a data writing system including a wireless selective call receiver or pager according to an embodiment of the present invention will be described with reference to the drawings. FIG. 1 is a schematic block diagram showing the structure of the receiver according to an embodiment of the present invention. As shown in FIG. 1, the receiver 100 includes, as major components, a RF section 1 for receiving a wireless selective call signal via an antenna, a ROM 3 having a transmission rate table 3-1, for storing a program and data indicative of transmission rates, a RAM 4 for storing a message contained in the received call signal, an informing section 5 operated to inform that the call signal to the receiver is received, a display section 6 for displaying a message, an EEPROM 7 for storing data such as an ID number assigned to the receiver and data for performing various functions of the receiver, and an infrared light interface section 8 for communicating with a data transfer apparatus 10. The receiver 100 further includes a CPU 2 for controlling various sections of the receiver 100.

Figure 3:
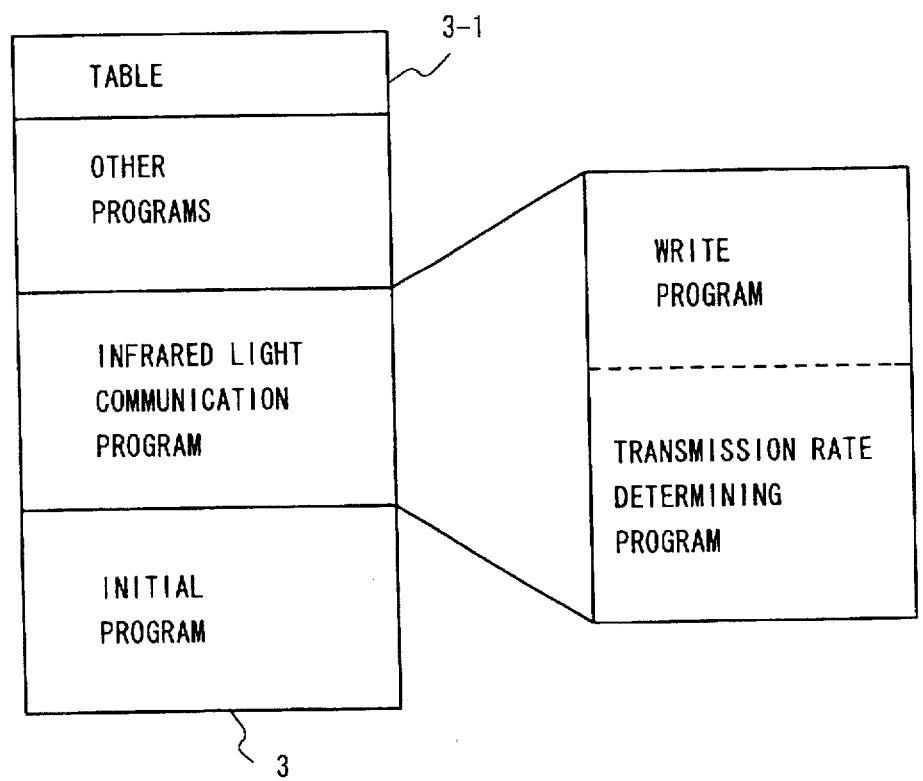
FIG. 3 is a diagram showing the internal structure in the ROM shown in FIG. 1.

FIG. 3 shows the content of the ROM 3. Referring to FIG. 3, the ROM 3 stores a program composed of an initial program, infrared light communication program, and other programs such as application programs including a receiver functioning program and the transmission rate table 3-1. The initial program is executed by the CPU 2 when the receiver 100 is turned on by a switch (not shown). At that time, a signal indicative of predetermined data is read out from the ROM 3 and externally transmitted by the infrared light interface section 8. If any response is not received within a predetermined time period after the signal is transmitted, the CPU 2 executes one of the other programs, e.g., the receiver functioning program. For instance, when a call signal is received by the RF section 1 while the CPU 2 executes the receiver functioning program, the CPU determines whether the call is destined to the receiver, using the ID number stored in the EEPROM 7. When it is determined that the call is destined to the receiver, the CPU 2 drives the informing section 5 to execute an informing operation. Further, the CPU 2 stores a message contained in a signal following the call signal in the RAM 4 and makes the display section 6 to display the message, if necessary.

If a response is received for the transmission of the signal indicative of the predetermined data, the CPU 2 automatically executes the infrared light communication program which is composed of a transmission rate determining program and a writing program. An appropriate transmission rate is determined based on the transmission rate determining program. When the transmission rate is determined, the writing program is automatically executed by the CPU 2 so that data is transmitted from the data transfer apparatus 10 and written in the EEPROM 7. If the data cannot be accurately written in the EEPROM 7, the transmission rate determining program is again executed.

Figure 2:
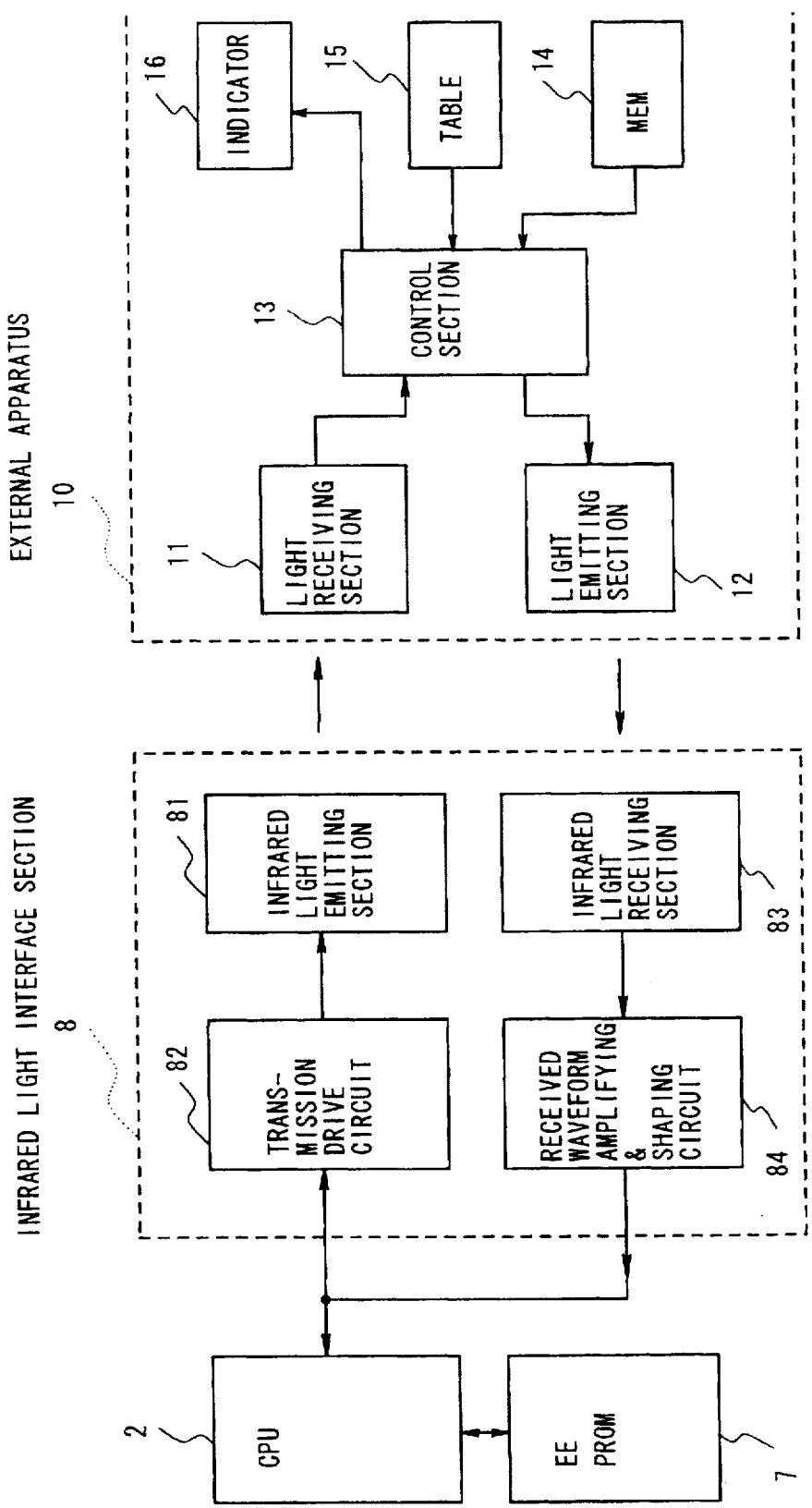
FIG. 2 is a block diagram showing the structures of an interface section of the receiver shown in FIG. 1 and a data transfer apparatus.

FIG. 2 is the structures of the infrared light interface section and the data transfer apparatus 10. Referring to FIG. 2, the infrared light interface section 8 is connected to the CPU 2 and is designed in such a manner that the operation is controlled by the CPU 2. The interface section 8 is composed of an infrared light emitting section 81, transmission drive circuit 82, infrared light receiving section 83, and received waveform amplifying & shaping circuit 84. The CPU 2 sets data indicative of a transmission rate in the transmission drive circuit 82 and controls the circuit 82 such that the circuit 82 drives the infrared light emitting section 81 with the set transmission rate. The infrared light emitting section 81 includes an infrared light emitting element and is driven by the transmission drive circuit 82 such that photoelectric conversion is executed and a modulated infrared light as the result of the conversion is transmitted to the data transfer apparatus 10. Also, the CPU 2 sets the data indicative of the transmission rate in the amplifying & shaping circuit 82. The infrared light receiving section 83 includes an infrared light receiving element. The receiving section 83 receives the modulated infrared light transmitted from the data transfer apparatus 10 and converts it into an electric signal to supply to the received waveform amplifying & shaping circuit 84. The circuit 84 amplifies and shapes the electric signal to supply to the CPU 2. In this manner, the CPU 2 writes the desired data contained in the signal supplied from the received waveform amplifying & shaping circuit 84 in the EEPROM 7.

The data transfer apparatus 10 is composed of a light receiving section 11 for receiving the infrared light emitted from the infrared light emitting section 81, a light emitting section 12 for emitting the infrared light to the infrared light receiving section 83, memory section 14 for storing the test data, table 15 for storing transmission rates which are predetermined between the receiver 100 and the data transfer apparatus 10 and the same as those stored in the table 3-1, indicator for indicating the end of a data write operation, and a control circuit 13 connected to the above-mentioned sections. The control circuit 13 is designed to make it possible to transmit and receive data to and from the receiver using the infrared light. This structure is substantially the same as the infrared light interface section 8 in the receiver 100 and therefore the description is omitted. When the test data is received, the control section 13 reads out the test data from the memory section 14 to compares the read out test data with the test data received by the light receiving section 11 and issues a transmission ready signal when both the data are matched and a reception failure signal when both the data are not matched. Further, when both the data are not matched, the control section 13 reads out one of the transmission rates from the table 15 to set to the light receiving section 12 and the light emitting section 12.

Figure 4:
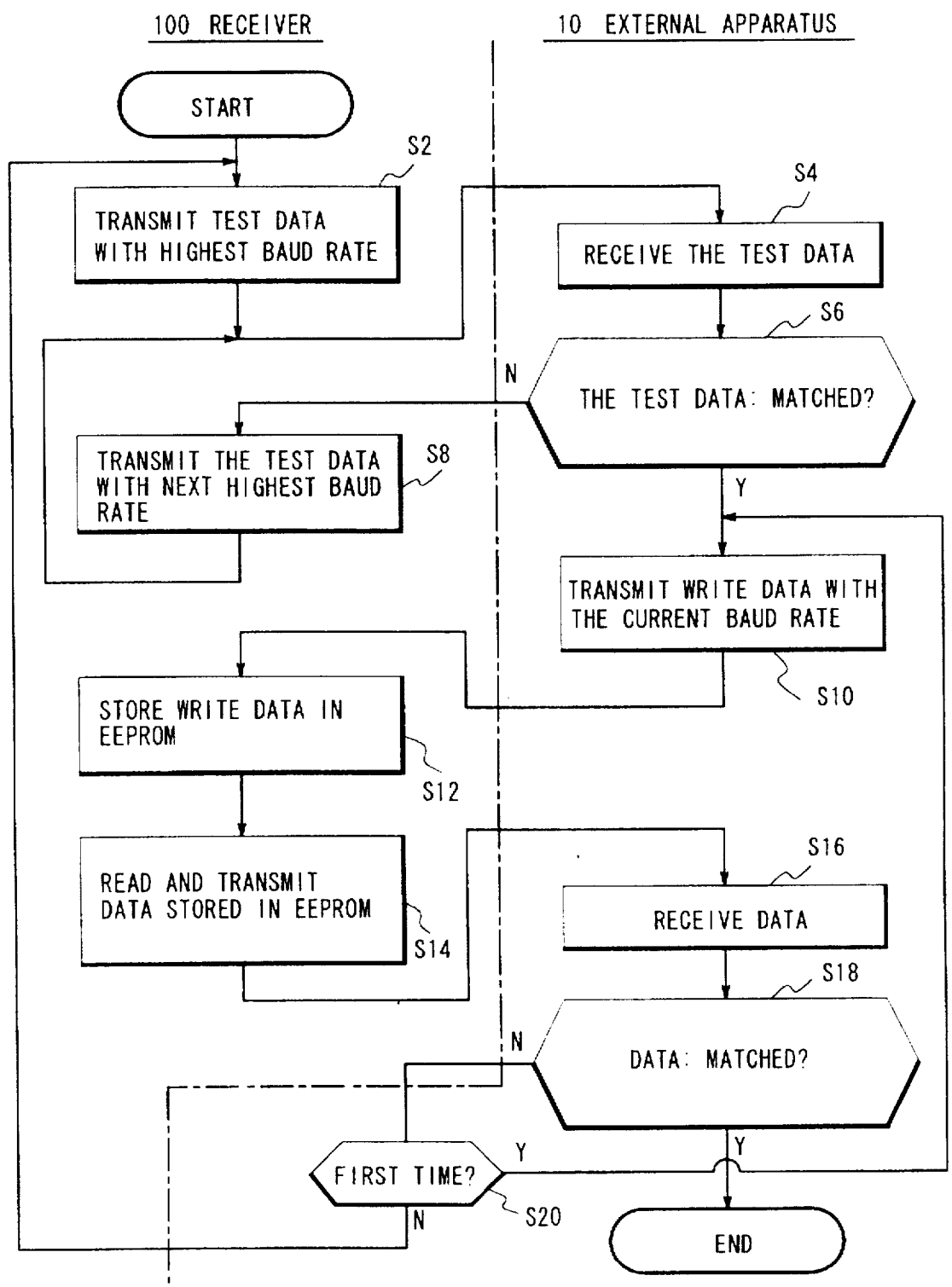
FIG. 4 is a flow chart for explaining the operation of the data writing system according to the embodiment of the present invention.

Next, the operation when data is written from the data transfer apparatus to the receiver 100 will be described below with reference to the flow chart of FIG. 4. Data such as the ID number assigned to the receiver 100 is not yet written in the EEPROM 7 of the receiver 100. Therefore, the receiver 100 cannot receive a wireless call destined to the receiver. As a result, the data such as the ID number cannot be written in the receiver 100 via the antenna using a radio frequency signal. In the following description, assume that the data such as the ID number of the receiver and data for performing various functions are not yet written in the EEPROM 7 built in the receiver 110.

First, when the receiver 100 is turned on, the CPU 2 automatically initiates the initial program to transmit a predetermined data through the infrared light interface section 8 with a predetermined low transmission rate. When any response is not received within a predetermined time period after the transmission of the predetermined data, the CPU 2 automatically executes the other programs. On the other hand, when a response is received within the predetermined time period, the CPU 2 automatically executes the infrared light communication program. In this case, the data transfer apparatus 10 needs to be set in the above predetermined low transmission rate and replies the response to the receiver 100 in response to the reception of the predetermined data.

When the communication program is executed in response to the reception of the response in the receiver 100, in a step S2, the CPU 2 reads out a data indicative of the highest transmission rate from the table 3-1 of the ROM 3 and sets it in the circuits 82 and 84. Subsequently, the CPU 2 reads out a test data of one byte having a predetermined bit pattern from the ROM 3 to supply to the transmission drive circuit 82. The circuit 82 drives the infrared light emitting section 81 with the set transmission rate based on the test data supplied from the CPU 2 to produce and transmit an infrared light to the data transfer apparatus.

In the data transfer apparatus, after transmitting the response, the control section 13 reads out data indicative of the highest transmission rate from the table 15 to set in the sections 11 and 12. Accordingly, when the test data is transmitted, the light receiving section 11 receives the test data in a step S4. If the test data is received, the control section 13 reads out a data stored from the memory section 14 to compare the read out data with the received data in a step S6. If both the test data are coincident, it is ensured that it is possible to communicate between the receiver 100 and the external apparatus 10 with the currently set transmission rate using the infrared light. In this case, a transmission ready signal is transmitted to the receiver 100 from the data transfer apparatus 10 via the light emitting section 12 with the currently set transmission rate. Subsequently, in the data transfer apparatus 10, the data to be written in the EEPROM 7 of the receiver 100 is emitted from the light emitting section 12 as the infrared light with the currently set transmission rate in a step S10. In the receiver 100, the infrared light is received by the infrared light receiving section 83, and demodulated by the received waveform amplifying & shaping circuit 84 in a step S12. Then, when it is determined that the transmission ready signal is received, the CPU 2 automatically executes the writing program. When the desired data is received through the infrared light receiving section 83 and the amplifying and shaping circuit 84 from the data transfer apparatus 10, the CPU 2 writes the received data into the EEPROM 7. In this case, a speedy writing operation is possible between the external apparatus 10 and the receiver 100 because the baud rate is higher than a conventionally used transmission rate.

On the other hand, in a case that it is determined in the comparison in the external apparatus 100 that the test data received from the receiver 100 is not coincident with the test data read out from the memory section 14, it could be considered that the test data cannot be accurately received or the test data cannot be received for a predetermined time period. In either case, a reception failure signal of the test data is emitted from the light emitting section 12 with the above-mentioned predetermined low transmission rate by use of the infrared light in the step S6. At that time, the control section 13 reads out a new lower transmission rate which is the next highest transmission rate available from the table 15 and sets it in the sections 11 and 12. In the receiver 100, when the reception failure signal is received, the CPU 2 reads out the same next highest transmission rate from the transmission rate table 3-1 and sets it in the circuit 82 and 84. Subsequently, in a step S8, the CPU 2 sends the same test data to the transmission drive circuit 82 such that infrared light is emitted from the infrared light emitting section 81 to the external apparatus 10 with the newly set transmission rate. In the external apparatus 10, the test data is received and the comparison of the test data is performed in the steps S4 and S6, as described above. As a result, if both the test data are coincident with each other, the data to be written is transmitted to the receiver 100 with the currently set transmission rate in the step S10, as described above.

In the comparison of the test data in the external apparatus 10, when the coincidence is not obtained, the reception failure signal is again transmitted to the receiver 100 in the same manner as described above. In the receiver, when the transmission failure signal is received, the transmission of the test data is executed with a new transmission rate that is the next higher transmission rate. Consequently, by repeating this operation, an appropriate transmission rate is determined between the receiver and the external apparatus.

As described above, the data is received from the data transfer apparatus 10 and written in the EEPROM 7 in the step S12. When the transmission of the data to the receiver 100, the data transfer apparatus issues a completion signal to the receiver 100. When receiving the completion signal, the CPU 2 performs a check operation in a step S14. In this case, the CPU 2 reads out the data from the EEPROM 7, and transmits the data to the transmission drive circuit 82 with the same currently set transmission rate as that when the data is transmitted from the external apparatus 10 to the receiver 100, such that the data is transmitted from the infrared light emitting section 81 to the external apparatus 10 using infrared light. In the external apparatus 10, the data is received in a step S16 and compared with the transmitted data in a step S18. When both the data are coincident, it is ensured that the data is accurately written in the EEPROM 7. In this case, the control section 13 resets a counter (not shown) built in the section 13 and drives the indicator 16 to indicate that the writing operation of the data is completed.

On the other hand, as the result of the comparison, in a case that both the data is not coincident, since it is determined that the data is not written accurately in the EEPROM 7 of the receiver, the control section 13 of the external apparatus 10 sets one in the counter (not shown). Then, the control section 13 reads out the data from the memory section 14 again and transmits it to the receiver 100 again. In the receiver 100, when the data is received, the CPU 2 rewrites the data in the EEPROM 7 in the same procedure as described above. Then, the CPU 2 reads out the data from the EEPROM 7 again and transmits to the external apparatus 10. In the external apparatus, the comparison is again executed. In this case, when both the data are not coincident in the step S18, and when it is determined in the step S20 that one is set in the counter, the reception failure signal is transmitted from the data transfer apparatus to the receiver 100 by the control section 13. The CPU 2 of the receiver 100 re-executes the above-mentioned transmission rate determining program in response to the reception failure signal to determine an appropriate transmission rate.

In this manner, if the transmission channel is established between the receiver 100 and the data transfer apparatus 10 and then the write data of the data is accurately written from the external apparatus to the receiver, the writing operation is completed. Therefore, the data transmission and writing operation can be completed faster with a higher transmission rate, compared to the conventional transmission rate. While the data transmission rate can be increased, the data transmission or writing error can be reliably prevented because it is always checked whether the data is accurately transmitted.

Further, since the connection between the receiver and the data transfer apparatus is performed by use of infrared light, it is not necessary to provide a connector to the receiver. As a result, it is also not necessary to take measurements on the water-proof property and the dust-proof property of the connector. Therefore, the receiver having a simple structure and design can be realized.

Next, the second embodiment of the present invention will be described below. The structures of the receiver and data transfer apparatus are the same as in the first embodiment but the data transfer apparatus does not include the table 15. The data transfer apparatus has the capability of setting an arbitrary transmission rate. In this embodiment, prior to the each of the transmission operations of the test data, data indicative of a transmission rate is transmitted from the receiver 100 to the data transfer apparatus by the CPU 2 through the infrared light interface section 8 with a predetermined low transmission rate in accordance with the transmission rate determining program.

Based on the data, the transmission rate is set in the transmission drive circuit 82 and amplifying & shaping circuit 84 in the receiver 100 and the light receiving section 11 and light emitting section 12 in the data transfer apparatus 10.

In this case, the receiver includes the interface section capable of transmitting and receiving data to and from the data transfer apparatus, and a control section for controlling the interface section can arbitrarily set a transmission rate to said external apparatus. Therefore, if any data error is generated when the test data is transmitted from the receiver to the external apparatus with a transmission rate, the data transmission rate is decreased to a new lower transmission rate again. Thus, the data transfer between the receiver and the external apparatus can be reliably performed without providing to the receiver a connector which causes a problem of water-proof property and dust-proof property.

If any data error is generated, since the reception failure signal is transmitted from the external apparatus, the set transmission rate is changed to a lower transmission rate. Therefore, the data transfer can be reliably and automatically performed.

Further, in a data writing system of the present invention, before the transfer operation of data is executed from an external apparatus to the receiver, the receiver transmits a preset test data with a transmission rate. When receiving the data, the external apparatus checks the presence or absence of data error; the external apparatus then transmits data to be written in the receiver to the receiver no error is received and transmitting a reception failure signal to the receiver an error is received. When receiving the data, the receiver writes the data in the storage section, and when receiving the reception failure signal, the receiver again transmits the test data to the external apparatus with a previous transmission rate lower than the transmission rate, resulting in reliable data transmission and reception.

In this case, when receiving the write data and then performing the writing operation to the storage section is completed, the receiver reads out the data to transmit to the external apparatus. The external apparatus compares the received write data with the previously transmitted write data to check the presence or absence of error and again transmits the data to the receiver when any error is received such that the receiver rewrites the data, resulting in a more-accurate data write operation.

Further, when the rewriting of the write data is completed, the receiver reads out the data to transmit to the external apparatus. The external apparatus compares the received write data with a previously transmitted write data to check the presence or absence of any error. When there is data error, the external apparatus transmits the reception failure signal to the receiver to restart the setting process of the transmission rate using the test data, resulting in a more accurate data transmitting and receiving operation.

What is claimed is:

1. A method of writing communication data from a data transfer apparatus into a wireless selective call receiver, comprising the steps of:

determining an appropiate transmission rate through communicating between a wireless selective call receiver and a data transfer apparatus via an optical transmission path while changing a transmission rate;

when the appropriate transmission rate is determined, automatically transmitting communication data with the determined transmission rate from said data transfer apparatus to said selective call receiver via the optical transmission path such that the communication data is written in said receiver; and when the writing operation of the desired data is completed, automatically verifying the communication data written in said receiver.

2. A method according to claim 1, wherein said determining step comprises the steps of:

(a) independently setting a predetermined transmission rate as a current transmission rate in said receiver and said data transfer apparatus;

(b) transmitting test data having a predetermined bit pattern using the current transmission rate from said receiver to said data transfer apparatus via the optical transmission path;

(c) receiving the test data in said data transfer apparatus and comparing the received test data with data stored in said data transfer apparatus to determine whether both the received test data and the stored data are coincident;

(d) when it is determined that both the received test data and the stored data are coincident, determining the current transmission rate as the appropriate transmission rate to transmit a transmission ready signal from said data transfer apparatus to said receiver via the optical transmission path such that said receiver can receive the communication data from said data transfer apparatus in response to the transmission ready signal;

(e) when it is not determined that both the received test data and the stored data are coincident, transmitting a reception failure signal from said data transfer apparatus to said receiver via the optical transmission path and setting a transmission rate lower than the current transmission rate as a new current transmission rate in the data transfer apparatus; and (f) setting the transmission rate lower than the current transmission rate as the new current transmission rate in said receiver in response to the reception failure signal to repeat said steps (b) through (e) until the appropriate transmission rate is determined.

3. A method according to claim 2, wherein the transmission rates are predetermined in a sequential order in said receiver and said data transfer apparatus.

4. A method according to claim 1, wherein said determining step comprises the steps of:

(a) setting a first predetermined transmission rate as a current transmission rate in said receiver;

(b) transmitting a data indicative of the current transmission rate from said receiver to said data transfer apparatus via the optical transmission path with a second predetermined transmission rate such that the current transmission rate is set in said data transfer apparatus;

(c) transmitting a test data having a predetermined bit pattern with the current transmission rate from said receiver to said data transfer apparatus via the optical transmission path;

(d) receiving the test data in said data transfer apparatus and comparing the received test data with a data stored in said data transfer apparatus to determine whether both the received test data and the stored data are coincident;

(e) when it is determined that both the received test data and the stored data are coincident, determining the current transmission rate as the appropriate transmission rate to transmit a transmission ready signal from said data transfer apparatus to said receiver via the optical transmission path such that said receiver can receive the communication data from said data transfer apparatus in response to the transmission ready signal;

(f) when it is not determined that both the received test data and the stored data are coincident, transmitting a reception failure signal from said data transfer apparatus to said receiver via the optical transmission path and setting the transmission rate to the second predetermined transmission rate; and (g) setting the transmission rate lower than the current transmission rate as the new current transmission rate in said receiver in response to the reception failure signal to repeat said steps (b) through (f) until the appropriate transmission rate is determined.

5. A method according to claim 1, further comprising the step of again executing said step of determining an appropriate transmission rate when it is not verified that the communication data is written.

6. A method according to claim 5, wherein said determining step requires communicating between a wireless selective call receiver and a data transfer apparatus via an optical transmission path at a currently set transmission rate and the transmission rate is changed to transmit at lower transmission rates.

7. A wireless selective call receiver, comprising:

an optical transmitting section for optically transmitting data with a currently set transmission rate;

an optical receiving section for optically receiving data with the currently set transmission rate;

a storage section for storing a receiver information;

a program storage section for storing a program including an initial program and an infrared light communication program which is composed of a transmission rate determining program and a write program; and a control section for executing the initial program to control said transmitting section to optically transmit a predetermined data when said receiver is turned on, and to initiate the infrared light communication program when a response is received by said receiving section within a predetermined time period after the transmission of the predetermined data, and for executing the transmission rate determining program of the infrared light communication program:

to determine an appropriate transmission rate through communication with an external apparatus using said transmitting and receiving sections while changing a transmission rate, for executing the write program of the infrared light communication program in response to an inputted transmission ready signal:

to control said receiving section to receive a communication data transmitted from the external apparatus with the determined transmission rate and to store the received data in said storage section; and when the write operation is completed, to read the stored data from said storage section to control said transmitting section to transmit the read out data to the external apparatus.

8. A receiver according to claim 7, wherein said control section executes the transmission rate determining program:

(a) to set a predetermined transmission rate as a current transmission rate in said transmitting and receiving sections;

(b) to control said transmitting section to transmit a test data having a predetermined bit pattern with the current transmission rate to said external apparatus;

(c) to control said receiving section to receive a transmission ready signal from said external apparatus such that said control section executes the write program; and (d) to control said receiving section to receive a reception failure signal from said external apparatus, and then to set a transmission rate lower than the current transmission rate as a new current transmission rate in said transmitting and receiving sections in response to the reception failure signal, and further to again perform the operation (b) until the appropriate transmission rate is determined.

9. A receiver according to claim 8, wherein the transmission rates are predetermined in a sequential order.

10. A receiver according to claim 7, wherein said control section executes the transmission rate determining program, (a) to set a first predetermined transmission rate as a current transmission rate in said transmitting and receiving sections;

(b) to control said transmitting section to transmit a data indicative of the current transmission rate to the external apparatus with a second predetermined transmission rate;

(c) to control said transmitting section to transmit a test data having a predetermined bit pattern with the current transmission rate to the external apparatus via said transmitting section in response to an inputted response from said external apparatus;

(c) to control said receiving section to receive a transmission ready signal from said external apparatus such that said control section executes the write program; and (d) to control said receiving section to receive a reception failure signal from said external apparatus, and then to set a transmission rate lower than the current transmission rate as a new current transmission rate in said transmitting and receiving sections, and further to again perform the operations (b) and (c) until the appropriate transmission rate is determined.

11. A receiver according to claim 7, wherein said control section again executes the transmission rate determining program when it is determined based on the communication data read out from said storage section that the communication data is not written.

12. A data writing system composed of a first apparatus and a second apparatus, comprising:

means for determining an appropriate transmission rate through communicating between a first apparatus and a second apparatus via an optical transmission path while changing a transmission rate;

means for, when the appropriate transmission rate is determined, automatically transmitting a communication data with the determined transmission rate from said second apparatus to said first apparatus via the optical transmission path such that the communication data is written in said first apparatus; and means for, when the write communication data is completed, automatically verifying whether the communication data is written in said first apparatus.

13. A data writing system according to claim 12, wherein said determining means comprises:

first means for setting a predetermined transmission rate as a current transmission rate in said first and second apparatuses;

second means for transmitting a test data having a predetermined bit pattern with the current transmission rate from said first apparatus to said second apparatus via the optical transmission path;

third means for receiving the test data in said second apparatus and comparing the received test data with a data stored in said second apparatus to determine whether both the received test data and the stored data are coincident;

fourth means for, when it is determined that both the received test data and the stored data are coincident, determining the current transmission rate as the appropriate transmission rate to transmit a transmission ready signal from said second apparatus to said first apparatus via the optical transmission path such that said first apparatus can receive the communication data from said second apparatus in response to the transmission ready signal;

fifth means for, when it is not determined that both the received test data and the stored data are coincident, transmitting a reception failure signal from said second apparatus to said first apparatus via the optical transmission path and setting a transmission rate lower than the current transmission rate as a new current transmission rate in the second apparatus; and sixth means for setting the transmission rate lower than the current transmission rate as the new current transmission rate in said first apparatus in response to the reception failure signal to repeatedly drive said second through fifth means until the appropriate transmission rate is determined.

14. A data writing system according to claim 12, wherein said determining means comprises:

first means for setting a first predetermined transmission rate as a current transmission rate in said first apparatus;

second means for transmitting a data indicative of the current transmission rate from said first apparatus to said second apparatus via the optical transmission path with a second predetermined transmission rate such that the current transmission rate is set in said second apparatus;

third means for transmitting a test data having a predetermined bit pattern with the current transmission rate from said first apparatus to said second apparatus via the optical transmission path;

fourth means for receiving the test data in said second apparatus and comparing the received test data with a data stored in said second apparatus to determine whether both the data are coincident;

fifth means for, when it is determined that both the received test data and the stored data are coincident, determining the current transmission rate as the appropriate transmission rate to transmit a transmission ready signal from said second apparatus to said first apparatus via the optical transmission path, wherein said first apparatus receives the communication data from said second apparatus in response to the transmission ready signal;

sixth means for, when it is not determined that both the received test data and the stored data are coincident, transmitting a reception failure signal from said second apparatus to said first apparatus via the optical transmission path and setting the transmission rate to the second predetermined transmission rate; and seventh means for setting the transmission rate lower than the current transmission rate as the new current transmission rate in said first apparatus in response to the reception failure signal to repeatedly drive said second through sixth means until the appropriate transmission rate is determined.

15. A data writing system according to claim 12, further comprising means for again driving said determining means when it is not verified that the communication data is written.

16. A data writing system according to claim 15, wherein said determining means transmits data from said third means to said fourth means at a currently set transmission rate and changes the transmission rate to transmit at lower transmission rates.

* * * * *